(12) United States Patent
Ford et al.

(10) Patent No.: US 7,689,514 B2
(45) Date of Patent: Mar. 30, 2010

(54) PRINTER TRANSFORMATION SERVICE

(75) Inventors: Arthur Kenneth Ford, Longmont, CO (US); Sharon Lee Foster, Boulder, CO (US); Nenad Rijavec, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 772 days.

(21) Appl. No.: 11/211,337

(22) Filed: Aug. 25, 2005

(65) Prior Publication Data

US 2007/0050296 A1    Mar. 1, 2007

(51) Int. Cl.
  *G06K 9/00*   (2006.01)
  *G06K 3/00*   (2006.01)
(52) U.S. Cl. .......................................... 705/67; 705/64
(58) Field of Classification Search ........................ None
See application file for complete search history.

(56) References Cited

U.S. PATENT DOCUMENTS

| | | | | |
|---|---|---|---|---|
| 5,768,488 A * | 6/1998 | Stone et al. | ................ | 358/1.18 |
| 5,993,088 A * | 11/1999 | Nogay et al. | ................... | 400/78 |
| 6,012,083 A | 1/2000 | Savitzky et al. | ............. | 709/202 |
| 6,314,425 B1 * | 11/2001 | Serbinis et al. | ............... | 707/10 |
| 6,515,756 B1 | 2/2003 | Mastie et al. | .............. | 358/1.15 |
| 6,701,846 B2 * | 3/2004 | Baba et al. | ................... | 101/484 |
| 6,748,471 B1 * | 6/2004 | Keeney et al. | .............. | 710/220 |
| 6,859,832 B1 * | 2/2005 | Gecht et al. | ................. | 709/224 |
| 6,927,869 B1 * | 8/2005 | Simpson et al. | ............ | 358/1.15 |
| 7,161,705 B2 * | 1/2007 | Klassen | ..................... | 358/1.18 |
| 7,180,619 B2 * | 2/2007 | Ferlitsch | .................... | 358/1.15 |
| 7,301,663 B2 * | 11/2007 | Ferlitsch | .................... | 358/1.15 |
| 2002/0089692 A1 * | 7/2002 | Ferlitsch | .................... | 358/1.15 |
| 2002/0097429 A1 * | 7/2002 | Ferlitsch | .................... | 358/1.15 |
| 2002/0178128 A1 | 11/2002 | Chen et al. | ................... | 705/400 |
| 2003/0035653 A1 | 2/2003 | Lyon et al. | ................... | 396/429 |
| 2003/0099252 A1 * | 5/2003 | Master et al. | ............... | 370/437 |
| 2003/0182248 A1 | 9/2003 | Murata et al. | ............... | 705/400 |

(Continued)

FOREIGN PATENT DOCUMENTS

EP    1103887 A1 *   5/2001

(Continued)

OTHER PUBLICATIONS

Print Suite for iSeries Advanced Print Utility User's Guide.pdf, IBM, May 2002, 154 pages.*

*Primary Examiner*—Calvin L. Hewitt, II
*Assistant Examiner*—James D Nigh
(74) *Attorney, Agent, or Firm*—Duft Bornsen & Fishman, LLP

(57) ABSTRACT

The present invention provides a method, data processing system and computer program product for providing a data stream transform service, for example for transforming a data stream into a format suitable for printing. A data-stream is divided into one or more work units, each work unit is provided to one or more transform engines to transform the work unit into the required format, and each transform engine is monitored whilst transforming a work unit. By monitoring each transform engine details of, for example, resource usage are obtained which may be used to calculate a fee to charge a client for performing transformation of a data stream, and/or failure of a transform engine can be detected and corrective action taken should a transform engine fail.

21 Claims, 2 Drawing Sheets

U.S. PATENT DOCUMENTS

| | | | | |
|---|---|---|---|---|
| 2004/0014468 A1 | 1/2004 | Walling | ............ | 455/422.1 |
| 2004/0073708 A1 | 4/2004 | Warnock | ............ | 709/246 |
| 2004/0246513 A1* | 12/2004 | McKinley et al. | ............ | 358/1.14 |
| 2007/0182992 A1* | 8/2007 | Barry et al. | ............ | 358/1.15 |

FOREIGN PATENT DOCUMENTS

| | | |
|---|---|---|
| JP | 2002304274 | 10/2002 |
| JP | 2003066796 | 3/2003 |
| WO | WO 02088978 A1 * | 11/2002 |

* cited by examiner

PRINTER TRANSFORMATION SERVICE

BACKGROUND OF THE INVENTION

1. Field of the Invention

The present invention relates to transformation of print data streams and more particularly to provision of a transformation service.

2. Description of the Related Art

In the field of printing a document is often sent for printing as a data stream in a format which is unsuitable for use with the printer on which the document is to be printed. As a result a common task in printing is, for example, to transform a data-stream from a first format created by a printing application to a second format suitable for a printer. Such a transformation is often performed by a print server which acts as an intermediary between the sender and the printer.

For example in the Advanced Function Presentation (AFP) architecture a client may send a Mixed Object: Document Content Architecture-Presentation (MO: DCA-P) document to a print server for printing, the print server then transforms the document to an Intelligent Printer Data Stream (IPDS) command stream and then forwards it to a printer, or other output device, for the purpose of outputting the document.

Further in this environment it is known to provide a printing service and charge for use of the service based on various factors.

For example U.S. Pat. No. 6,515,756 to IBM discloses a printing service in which a client is charged according to a number of copies printed.

Further, for example, JP2002-304274 to Canon Inc. discloses a print service which calculates the number of pages in a print job and then charges the submitter of the job a fee based on the number of pages. The job is not printed until the fee is paid. Further US 2002/1078128 to Hewlett-Packard Co. discloses a printing system in which a document is prepared for printing, but the document is not printed until an appropriate payment has been authorized.

Further, for example, JP2003-066796 to Ricoh Co Ltd discloses a print system which determines an amount of information in a print file, uses this to determine an amount of toner required for printing the print file, and then charges a fee based on the determined amount of toner.

Further, for example, US2003-0182248 discloses a service, such as a print system, which assigns use points according to services used when printing a document, and then charges according to the assigned use points.

However, each of these prior art solutions include the printing of the document and accordingly the determined charges are intended to cover the cost of the printing the document. However in some situations a full printing service is not required, for example where the document creator has access to a printer but not the software required to transform the document into a format suitable for the printer. In this case a transform service is required.

For example US2004/0073708 to Kevin L. Warnock discloses a subscription transform service which converts an XHMTL document to a PDF document. A charge is made for subscription to the service for a given time period, or for a given number of transformations and amount of storage required for transformed documents.

However, in printing there are many different transformations which may be required and these are generally complex due to the number of unique elements within any given printer data stream. For example these elements may consist of fonts, text, raster images, vector images, bar code data, etc. Accordingly a transform service which can cope with large data streams and/or many different data stream transformations and/or peak loads, requires a relatively powerful machine which supports a plurality of transformations. Such a machine may or may not be dedicated to the task and further may be capable of parallel processing using a plurality of transform engines each of which execute transform programs. This enables a data stream to be divided into multiple parts (work units) for processing in parallel, using different transform engines. Further due to the complexity of the transformations, transform programs may encounter errors during processing. For example, such errors can be due to poor software design, a poor understanding of existing requirements, coding errors, or inability of an older transform program to handle newer data stream elements. For example, given two transform programs which perform the same transformation, but developed by independent sources, it is likely that each transform program will encounter errors at different points in their processing such that whilst one fails to transform a given data stream the other succeeds.

The complexity and CPU intensive nature of data transformation leads to three potential problems: firstly an entity which requires to transform print jobs must purchase equipment powerful enough to handle the peak transform load; secondly in many industries the processing occurs in a short time window such that transform capacity is mostly idle; and thirdly the transform machine and software have to be administered, for example to upgrade for new software or to increase capacity, to fix problems, and to generally maintain the system, such administration entailing considerable system administration costs. Further, for example, with regard to system administration costs, if an error occurs during the transformation of a data stream from one format to another format (e.g. from Printer Command Language (PCL) to AFP), human intervention is required to perform problem determination. For example intervention may involve normalization of the data stream by removing or ignoring portions of it, or use of an alternate transform program to perform the transformation.

SUMMARY

It is an object of the present invention to provide a transform service which overcomes one or more of these problems. This is achieved by monitoring a transform engine, which performs a transformation of data, to obtain information relating to the transformation of the data, and using that information to perform a related action. The information obtained will depend upon the related action to be performed. For example, the information may relate to resources used when transforming the data, such information being used to calculate a fee to charge for transforming the data. For example, the information may be used to detect failure of a transform engine to successfully perform transformation of the data such that corrective action can be taken.

Accordingly, according to a first aspect the present invention provides a method comprising: creating at least one work unit from a data stream in a first format received from a client; providing the at least one work unit to at least one transform engine to transform the at least one work unit into a second format; monitoring the at least one transform engine, whilst it is transforming the at least one work unit, to obtain information relating to transformation of the at least one work unit; and performing an action based on the information obtained whilst monitoring the transform engine.

According to a second aspect the present invention provides a data processing system comprising: a data stream receiver for creating at least one work unit from a data stream in a first format received from a client and providing the at least one work unit to at least one transform engine; at least one transform engine for transforming a work unit from the first format into a second format; and a monitor for monitoring the at least one transform engine, whilst it is transforming the at least one work unit, to obtain information relating to transformation of the at least one work unit, and for performing an action based on the obtained information.

According to a third aspect the present invention provides a computer program product comprising a computer useable medium having a computer readable program, wherein the computer readable program when executed on a computer causes the computer to: create at least one work unit from a data stream in a first format received from a client; provide the at least one work unit to at least one transform engine to transform the at least one work unit into a second format; monitor the at least one transform engine, whilst it is transforming the at least one work unit, to obtain information relating to transformation of the at least one work unit; and perform an action based on the information obtained whilst monitoring the transform engine.

Optionally the action taken can be to calculate a fee to charge the client for transforming the data stream. Alternatively, or in addition, the action can be to use the information to detect a failure of a transform engine and taking corrective action to ensure performance of the transformation.

For example, if an action is to calculate a fee, the information could include elapsed time, details of the transform program used by the transform engine, and/or resource usage. For example resource usage can include CPU usage, memory usage, dataset size used during transformation, and/or contents of the data stream.

Optionally the fee is based on assumed usage; alternatively it is based on actual usage.

Optionally the fee is calculated according to a pricing plan associated with the client. For example the pricing plan can be based on, for example, intended usage for a period of time, single usage, the first and second formats, size of the data stream, and/or regularity of use.

Optionally resources associated with a client can be stored and a fee charged for storage of the resources. For example the resources could be used when transforming data streams received from the client.

Optionally, if an action is to detect a failure of a transform engine and take corrective action to ensure performance of the transformation, the corrective action is to re-try the transformation in the same or a different transform engine. If a different transform engine is used, optionally the failed transform engine and different transform engine execute different versions of a given transform program. Alternatively the failed transform engine and different transform engine execute different transform programs for performing the same transformation.

Alternatively, if an action is to detect a failure of a transform engine and take corrective action to ensure performance of the transformation, the corrective action uses at least one second transform engine to transform the given work unit to an intermediate format and then uses a third transform engine to transform the given work unit from the intermediate format to the second format. For example, this alternative may be selected if no transform engine is available to replace the failed transform engine and which can transform the given work unit from the first format to the second format.

Note that the term "transform engine" refers to an executor of a particular transform program in a particular location, such as on a CPU. For example, different transform engines can refer to executors of the same transform program in different locations, or executors of different transform programs in the same location.

Thus in one embodiment the present invention enables the provision of a data stream transformation service which can be used by a client, on an as needed basis. The transformation service monitors one or more transform engines which perform the transformation of the data stream and information obtained during monitoring is used to perform calculate a fee to charge the client for transforming the data stream. The transformed datastream is provided to the client.

Accordingly the problem of the client needing to purchase and administer a powerful a machine for the purpose of performing data stream transformation is overcome. A fee can be charged based on monitored use of one or more transform engines which are used to perform the transformation. This provides many conveniences for the client, for example the transform service may be used to supplement limited existing capacity and/or function of the clients own system. Further as client requirements grow or new software becomes available the transform service can be used to provide a seamless upgrade path, for example by making additional use of the transform service whilst upgrading of the clients own system is in progress, thus enabling the client to upgrade with no loss in production.

In summary the present invention provides a method, data processing system and computer program product for providing a data stream transform service, for example for transforming a data stream into a format suitable for printing. A data-stream is divided into one or more work units, each work unit is provided to one or more transform engines to transform the work unit into the required format, and each transform engine is monitored whilst transforming a work unit. By monitoring each transform engine details of, for example, resource usage are obtained which may be used to calculate a fee to charge a client for performing transformation of a data stream, and/or failure of a transform engine can be detected and corrective action taken should a transform engine fail.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

DETAILED DESCRIPTION

Figure 1:
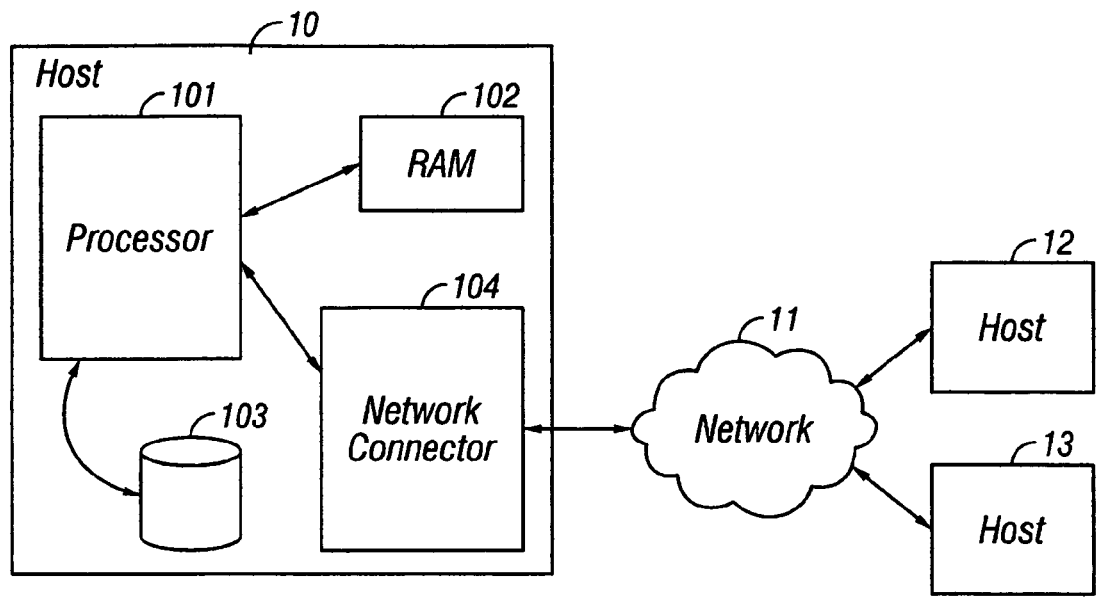
FIG. 1 is a schematic diagram of a data processing system in which the preferred embodiment of the present invention could be advantageously applied.

FIG. 1 is a schematic diagram of a data processing system in which the preferred embodiment of the present invention could be applied. In FIG. 1, a client/server data processing host 10 is connected to other client/server data processing host 12 and 13 via a network 11, which could be, for example, the Internet. A transform service according to the preferred embodiment of the present invention may be installed on one or more such client/server data processing hosts and accept request to transform a data stream from another client/server data processing host. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

In the preferred embodiment of the present invention a transform service is provided which is available for use by client to transform data streams from a first format to a second format. Typically this will be for the purpose of printing. On receipt of a data stream for transforming from a client the transform service creates at least one work unit from the data stream, and provides each work unit to a work engine for transforming from the format of the received data stream to the required format. For example if 2 work units are created the work units could be provided to a single work engine or to separate work engines. For example the format of the received data stream could be PCL and the required format AFP. Each transform engine is then monitored whilst performing transformation of a work unit in order to obtain information which can be used to calculate a fee to charge the client for performance of the transformation.

Figure 2:
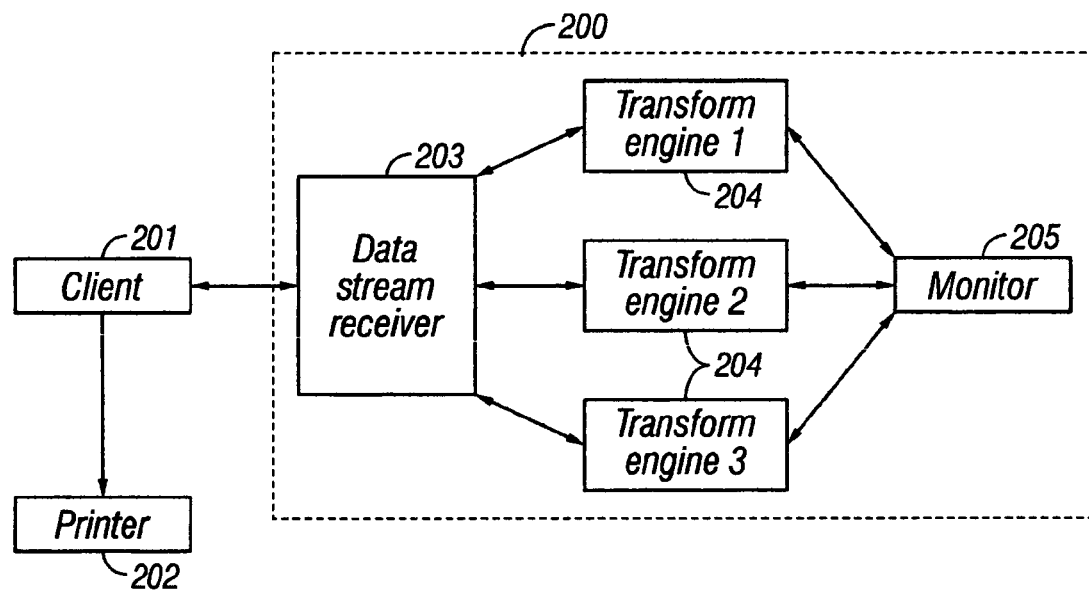
FIG. 2 is a schematic diagram of a example transform service according to the preferred embodiment of the present invention.

FIG. 2 is a schematic diagram of an example transform service 200 according to the preferred embodiment of the present invention. In the figure, a client 201 provides a data stream over a network (not shown) to the transform service 200 for transformation into a format suitable for printing at printer 202. The data stream is received by the data stream receiver 203 of the transform service 200, which then creates at least one work unit from the data stream, and provides the at least one work unit to at least one of the transform engines 204, for transformation to the required format. During transformation by a transform engine, monitor 205 obtains information from the transform engine which can be used to calculate a fee to charge the client for performance of the transformation and/or to detect failure of the transform engine to perform a transformation. For example details which may be used for calculating a fee are the format and/or size of the received data stream, details of the format and/or size of the transformed data stream, CPU usage, memory usage, etc.

The fee charged can be based on either actual usage or assumed usage. In the actual usage, the resource usage, such as CPU, memory, disk and bandwidth, for each work unit is measured. A pricing formula is then used to calculate a fee from the measured usage. An advantage of this pricing approach is that a client is only charged for actual usage. The disadvantage is that the price for each transformation is somewhat unpredictable in advance. For example, if the client switches to a new vendor which makes more complex PDF, the price to process a data stream would rise unexpectedly.

In assumed usage the pricing model is based on the "assumed" price for a particular type of the work unit. For example, a page of TIFF with black and white output, a page of PDF with the black and white output, a page of TIFF with color output, and a page PDF with color output, may each be associated with a different pre-determined charge. This pricing model allows the cost to be predictable, in the sense that the client can know in advance, based on the number of pages in the input and output data streams, how much each transformation will cost.

Further pricing can cover several usage models. For example, for one usage model, a client subscribes to a model which includes access to specified transforms (e.g., customer can subscribe to PDF service, but not PCL service), with a pre-determined limit on usage. The actual usage is then measured and if the client requires additional capacity extra usage must be purchased.

Further, the transform service, in addition to providing a service for transforming a data stream, may further allow a client to store resources which are used, for example, by multiple transformation requests from the client. The resources are stored in private storage for a calculated fee. For example stored resources can include fonts and/or images.

Referring back to FIG. 2, monitor 205 may further, or alternatively, detect failure of a transform engine to transform a work unit and initiate corrective action. In this case the corrective action is to re-try transformation of the work unit, either in the same (primary) transform engine which failed, or in a different (alternate) transform engine or engines. The choice of corrective action will depend upon the reason for failure of the transform engine. For example if the failure is due to an error or restricted support of the primary transform engine a different transform engine will be used, alternatively if the failure is of a temporary nature, such as a memory shortage in the overall system, the same engine will be retried.

Note that if an alternate transform engine is used, this may or may not require normalization of the data stream. Normalization is required where the primary and alternate transform engines support a different input/output format, for example, different versions of the same format or, a proprietary format and a standardized format. However, if normalization will result in some loss of information in the converted data stream, use of the alternate may be rejected.

For example, if the primary transform engine accepts PDF 1.5 and the alternate transform engine accepts PDF 1.4 or less, the work unit format will need to be normalized from PDF 1.5 to PDF 1.4. However note that, in this case, if the work unit data includes PDF 1.5 specific features such that normalization would result in data loss, a different alternate engine which does not result in such a loss will be used, if such a transform engine is available.

For example, if the primary transform engine accepts ASCII text rendered with a Type1 font and the alternate transform engine accepts UNICODE rendered with a True Type font, normalization is required to convert ASCII to UNICODE and from Type1 font to UNIICOFDE TrueType font. However, conversion from Type1 font to TrueType font may result in loss of information concerning the appearance of the converted data stream in which case use of the alternate may be rejected.

Accordingly, preferably an alternate transform engine accepts the same format of input, and provides the same format of output, as the primary transform engine. Further if the alternate transform engine is not to fail for the same reason as the primary transform engine the alternate transform engine should be selected to avoid this. For example this may involve selecting an alternate transform engine which either comprises a different version of the same transform program as the primary transform engine, or a different transform program which performs the same function as the transform program of the primary transform engine. Alternatively a plurality of alternate transform engines can be selected, the alternate transform engines together performing a transformation equivalent to that of the first transform engine.

For example a different transform program could be of a different design, implementation, or approach, when compared to the primary transform program.

An example of different design is PS to TIFF transform programs where one program uses a device driver interface and the other uses a file filter and rasterizer interface.

An example of different implementations is PS to AFP transform programs where one program is provided by a first provider and the other by a different provider.

An example of different approaches is PCL to AFP transform programs where one program is written in a procedural programming language and the other in an object oriented programming language.

An example of using a plurality of alternate transform engines is where the primary transform engine provides a PostScript to AFP transformation, a first alternate transform engine provides a Postscript to TIFF transformation, and a second alternate engine provides a TIFF to AFP transformation. Accordingly the TIFF format is used as an intermediate format for transforming from PostScript of AFP.

Figure 3:
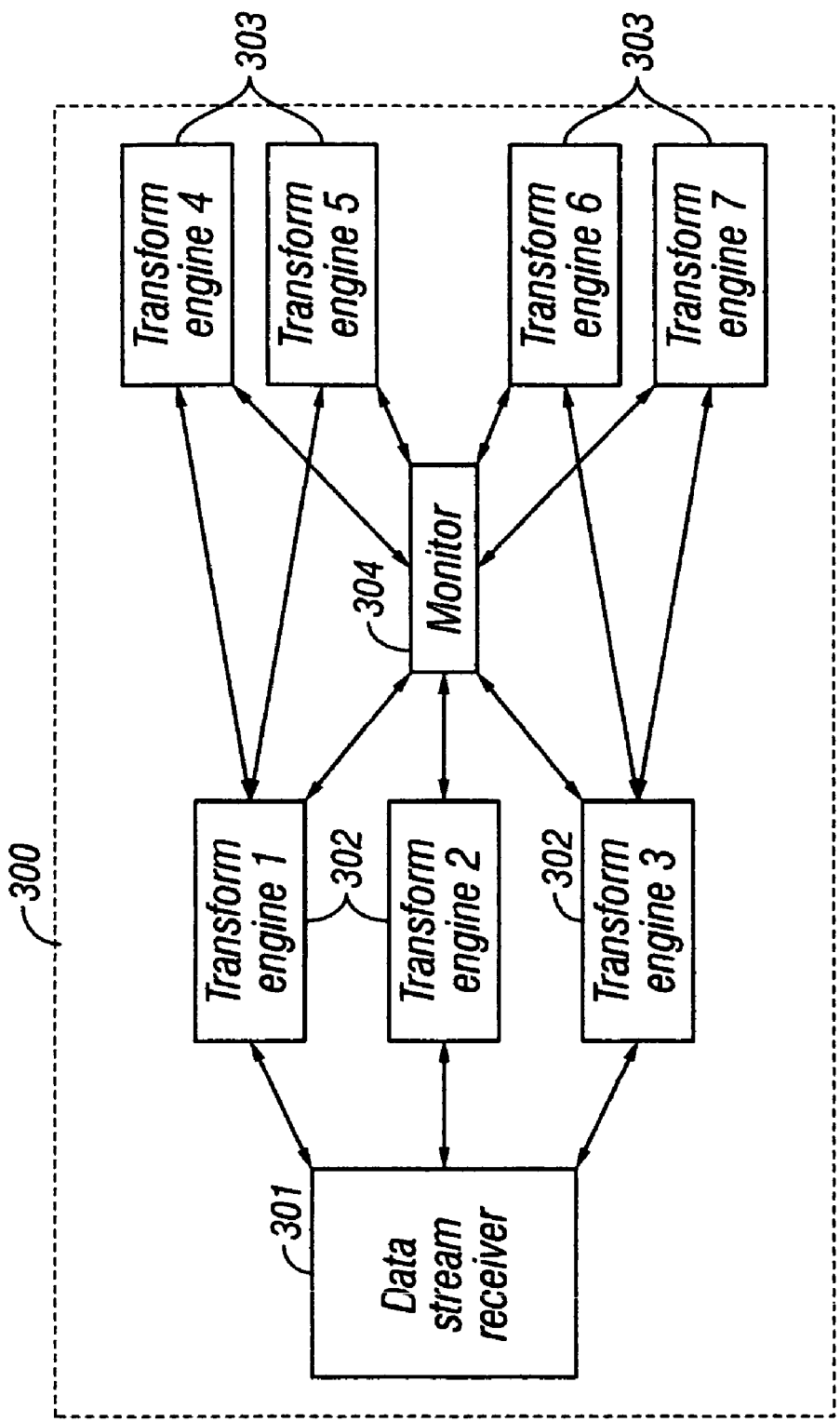
FIG. 3 is a schematic diagram of an alternative example of a transform service according to the preferred embodiment of the present invention.

FIG. 3 is a schematic diagram of an alternate embodiment a transform service 300 according to the present invention. In this embodiment the data stream receiver (301) creates at least one work unit from a received data stream, and provides the at least one work unit to at least one of the transform engines 302, for transformation to the required format. Further alternate transform engines 303 are available which may be used by transform engines 302 when performing a transformation or may be selected to replace a failed transform engine should the monitor 304 detect failure of a transform engine. During transformation by a transform engine monitor 304 obtains information from the engine which can be used to calculate a fee to charge the client for performance of the transformation and/or detect failure of the transform engine to perform a transformation.

Note that in FIGS. 2 and 3 the data stream receiver (203, 301) is shown separate from the monitor (205, 304); alternatively, these could be the same component. Further in these figures, the data stream receiver, monitor, and transform engines are shown as part of a transform service. Note that this does not, for example, require that they each execute on the same data processing host or same CPU. One or more of these components can be run on different CPU's and/or in different data processing hosts.

FIG. 4 is a flowchart of the method used by a transform service according the preferred embodiment of the present invention. At step 401 a data-stream for transforming from a first format to a second format is received from a client. From the data stream one or more work units are created from the data-stream at step 402 each comprising a portion of the data-stream. For example a larger data-stream may be divided into a plurality of work units for processing in parallel, where a smaller data-stream will be processed as a single work unit. For example the number of work units created can be based on a desired processing time for transforming the data stream and/or storage capacity of a transform engine. At step 403 each work unit is provided to an appropriate transform engine for processing, where a transform engine may be provided with one or more work units. At step 404 each transform engine provided with a work unit is monitored in order to detect failure to process a work unit and to obtain information of resource usage when processing a work unit. When completion of the processing of a work unit by a transform engine is detected, at step 405 a check is made to see of the engine failed. If the engine did fail, at step 406 the work unit which the failed transform engine was processing is re-allocated to the same or a different transform engine, and processing continues at step 404. If the transform engine did not fail, at step 407 a check is made to see if the job is complete, that is if all of transform engines have completed processing work units created from the received data-stream. If the job is not complete processing continues at step 404. However, if the job is complete a fee for transforming the data-stream is calculated at step 408, the calculation using information obtained at step 404 for each transform engine used to process a work unit created from the data-stream. Finally at step 409 the transformed data-stream is created from the transformed work unit(s) and provided back to the client in consideration for the calculated fee.

Note that a skilled person will realize that many variations of the method of FIG. 4 are possible, for example by changing the order of some steps, performing some steps in parallel, and further creating several steps from a single step. For example, the monitoring step 404 may be performed in parallel to the other steps and further steps 402 and 403 may be re-written to provide each work unit to a transform engine as it is created.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Examples of input formats of a data stream include, but are not limited to, PostScript, PDF, TIFF, GIFF, JPEG, MO; DCA, PCL, SAP-ABAP, SAP-OTF, HP-GL, PPML, and IPDS. Examples of output format of a data stream include, but are not limited to IPDS, MO: DCA, TIFF, PostScript, PCL, and PDF. A skilled person will realize that other input and output formats are possible.

What is claimed is:

1. A computer implemented method of providing a fee based print data transformation service to a user, the method comprising:
   receiving, by a computer, a first format print datastream from a client device;
   creating, by the computer, one or more work units, each comprising a portion of the first format print datastream;
   transmitting, by the computer, the one or more work units to a transform engine;
   generating a second format datastream by the transform engine by processing the one or more work units;
   monitoring, by the computer, the transform engine, the monitoring comprising obtaining information regarding resources used by the transform engine while performing the processing of the one or more work units;
   calculating, by the computer, a fee based on the information obtained by the monitoring;
   receiving, by the computer, the calculated fee; and
   transmitting, by the computer, the second format datastream to the client device in response to receiving the calculated fee.

2. The computer implemented method of claim 1 further comprising:
   determining that the print data transformation service is not available to directly generate the second format print datastream from the first format print datastream;
   generating an intermediate format print datastream at the computer by transforming the first format print datastream; and
   generating the second format print datastream at the computer by transforming the intermediate format print datastream.

3. The computer implemented method of claim 1 wherein the first format print datastream is a Mixed Object: Document Content Architecture (MO:DCA) datastream and the second format print datastream is an Intelligent Printer datastream (IPDS).

4. The computer implemented method of claim 1 wherein the fee is calculated according to a pricing plan associated with the user.

5. The computer implemented method of claim 1 further comprising:
   storing at least one of the first format print datastream and the second format print datastream; and
   calculating a fee to charge the user for the storage.

6. The computer implemented method of claim 1 wherein determining the computational resources utilized further comprises:
   determining that a failure has occurred while generating the second format print datastream;
   providing additional computational resources; and
   generating the second format print datastream using the additional computational resources.

7. The computer implemented method of claim 6 wherein generating the second format print datastream further comprises:
   generating an intermediate format print datastream by transforming the first format print datastream, wherein the intermediate format print datastream is generated by the additional computational resources; and
   generating the second format print datastream by transforming the intermediate format print datastream.

8. A data processing system for providing a fee based print data transformation service to a user, the data processing system comprising:
   a client/server host computer including a processor; and
   a memory connected to the processor storing executable instructions that when executed by the processor cause the processor to perform the steps of
   receiving, by a computer, a first format print datastream from a client device;
   creating, by the computer, one or more work units, each comprising a portion of the first format print datastream;
   transmitting, by the computer, the one or more work units to a transform engine;
   generating a second format datastream by the transform engine by processing the one or more work units;
   monitoring, by the computer, the transform engine, the monitoring comprising obtaining information regarding resources used by the transform engine while performing the processing of the one or more work units;
   calculating, by the computer, a fee based on the information obtained by the monitoring;
   receiving, by the computer, the calculated fee; and
   transmitting, by the computer, the second format datastream to the client device in response to receiving the calculated fee.

9. The data processing system of claim 8 wherein the processor is further operable to determine that the print data transformation service is not available to directly generate the second format print datastream from the first format print datastream, to generate an intermediate format print datastream by transforming the first format print datastream, and to generate the second format print datastream by transforming the intermediate format print datastream.

10. The data processing system of claim 8 wherein the first format print datastream is a Mixed Object: Document Content Architecture (MO:DCA) datastream and the second format print datastream is an Intelligent Printer datastream (IPDS).

11. The data processing system of claim 8 wherein the fee is calculated according to a pricing plan associated with the user.

12. The data processing system of claim 8 further comprising:
   a storage system operable to store at least one of the first format print datastream and the second format print datastream, and to calculate a fee to charge the user for the storage.

13. The data processing system of claim 8 wherein:
   the client/server host computer is further operable to determine that a failure has occurred while generating the second format print datastream, and to provide additional computational resources; and
   the processor is further operable to generate the second format print datastream using the additional computational resources.

14. The data processing system of claim 13 wherein the processor is further operable to generate an intermediate format print datastream by transforming the first format print datastream, wherein the intermediate format print datastream is generated by the additional computational resources, and wherein the processor is further operable to generate the second format print datastream by transforming the intermediate format print datastream.

15. A computer readable storage medium tangibly encoded with computer-executable instructions, when executed by a computer system causes the computer to perform the steps of:
   receiving, by a computer, a first format print datastream from a client device;
   creating, by the computer, one or more work units, each comprising a portion of the first format print datastream;

transmitting, by the computer, the one or more work units to a transform engine;

generating a second format datastream by the transform engine by processing the one or more work units;

monitoring, by the computer, the transform engine, the monitoring comprising obtaining information regarding resources used by the transform engine while performing the processing of the one or more work units;

calculating, by the computer, a fee based on the information obtained by the monitoring receiving, by the computer, the calculated fee; and transmitting, by the computer, the second format datastream to the client device in response to receiving the calculated fee.

16. The computer readable medium of claim 15 wherein the method further comprises:

determining that the data transformation service is not available to directly generate the second format print datastream from the first format print datastream;

generating an intermediate format print datastream at the computer system by transforming the first format print datastream; and generating the second format print datastream at the computer system by transforming the intermediate format print datastream.

17. The computer readable medium of claim 15 wherein the first format print datastream is a Mixed Object: Document Content Architecture (MO:DCA) datastream and the second format print datastream is an Intelligent Printer datastream (IPDS).

18. The computer readable medium of claim 15 wherein the fee is calculated according to a pricing plan associated with the user.

19. The computer readable medium of claim 15 wherein the method further comprises:

storing at least one of the first format print datastream and the second format print datastream; and calculating a fee to charge the user for the storage.

20. The computer readable medium of claim 15 wherein determining the computational resources utilized further comprises:

determining that a failure has occurred while generating the second format print datastream;

providing additional computational resources; and generating the second format print datastream using the additional computational resources.

21. The computer readable medium of claim 20 wherein generating the second format print datastream further comprises:

generating an intermediate format print datastream by transforming the first format print datastream, wherein the intermediate format print datastream is generated the additional computational resources; and generating the second format print datastream by transforming the intermediate format print datastream.

* * * * *